United States Patent [19]

Kamada

[11] 4,232,078
[45] Nov. 4, 1980

[54] MULTI-COLORED SYNTHETIC RESIN SHEET

[75] Inventor: Isao Kamada, Otake, Japan

[73] Assignee: Mitsubishi Rayon Company, Limited, Tokyo, Japan

[21] Appl. No.: 951,086

[22] Filed: Oct. 13, 1978

[51] Int. Cl.$^2$ .................................................. B32B 27/00
[52] U.S. Cl. .................................. 428/195; 260/42.21; 264/216; 428/332
[58] Field of Search .................. 428/195, 332, 480; 260/42.21, 42.53, 42.54; 8/2.5, 179; 264/73, 78, 216

[56] References Cited

U.S. PATENT DOCUMENTS

| 3,894,826 | 7/1975 | Kato ................................ 264/216 X |
| 4,016,133 | 4/1977 | Hyosu et al. ...................... 260/42.21 |
| 4,046,850 | 9/1977 | Kato et al. ........................ 264/216 |
| 4,097,230 | 6/1978 | Sandhu ............................. 428/480 X |
| 4,102,848 | 7/1978 | Koch et al. ....................... 260/42.21 X |

Primary Examiner—Thomas J. Herbert, Jr.
Attorney, Agent, or Firm—Oblon, Fisher, Spivak, McClelland & Maier

[57] ABSTRACT

A multi-colored synthetic resin sheet having an upper surface, a lower surface and a uniformly colored longitudinal cross-section which has at least two longitudinally adjacent different colors, with the boundary portion between the colors being in a gradated state on the upper surface and throughout a transversal section of sheet, is formed by adjacently feeding at least two differently colored polymerizable liquids into a polymerizing apparatus and polymerizing and hardening the materials.

26 Claims, 5 Drawing Figures

MULTI-COLORED SYNTHETIC RESIN SHEET

BACKGROUND OF THE INVENTION

1. Field of the Invention

The present invention relates to a multi-colored synthetic resin sheet having an upper surface and a back surface wherein the boundary between adjacent colors is gradated on the surface and throughout a transversal cross-section of the sheet. This invention further relates to a multi-colored synthetic resin sheet which is formed by pouring, at least two differently colored polymerizable liquid materials into a polymerizing apparatus, such as an opposed belts-type-continuous sheet making apparatus, to effect polymerization and hardening.

2. Description of the Prior Art

Heretofore, multi-colored sheets having gradated boundary portions have been produced by first forming a sheet and then applying coating materials of different colors to the surface of the sheet. Coating can be effected by spraying, printing, coating, etc. or by applying a colored film to the surface of a sheet; wherein the film had previously been prepared by spraying, printing, coating, dyeing, etc.

However, these sheets prepared by overlaying a film onto a substrate are characterized by low permanence in that separation due to external forces or with lapse of time can be a problem. Moreover, when such sheets are subject to heat or stretching such as during molding, creases can occur between the colored film and the core sheet due to the differences in expansion coefficients; or the color of the stretched portion can be deteriorated resulting in a noticeable difference in color density between the stretched and unstretched portions, which can spoil the apperance of the products. A need therefore, continues to exist for a multi-colored synthetic sheet having at least two colors which can be molded or heated without the aforementioned disadvantages.

SUMMARY OF THE INVENTION

Accordingly, one object of the invention is to provide a multi-colored synthetic resin sheet having at least two colors which will be high in permanence.

Another object of the invention is to provide a multi-colored synthetic sheet wherein the boundary portion between adjacent different colors is gradated.

Still another object of the invention is to provide a method for the preparation of multi-colored synthetic resin sheets.

Briefly, these objects and other objects of the invention, as hereinafter will become more readily apparent, can be obtained by providing a multi-colored synthetic resin sheet having an upper surface, a lower surface, and a uniformly colored longitudinal cross-section which has at least two longitudinally adjacent different colors, with the boundary portion between said colors being in a gradated state on the upper surface and on the lower surface and throughout a transversal cross-section of said sheet. More particularly, this invention also concerns a method of producing a multi-colored synthetic resin sheet which comprises: adjacently feeding onto a moving belt at least two differently-colored polymerizable liquid materials, polymerizing and hardening said liquids; thereby obtaining a multi-colored synthetic resin sheet which has an upper surface, a lower surface, and a uniformly colored longitudinal cross-section, which has at least two longitudinally adjacent colors with the boundary portion between said colors being in a gradated state on the upper surface, on the lower surface and throughout a transversal cross-section of said sheet.

The multi-colored synthetic resin sheets of the present invention are suitable as blinds for windows and vehicles, displays of articles, various partionings, fences of porches, windscreens, etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
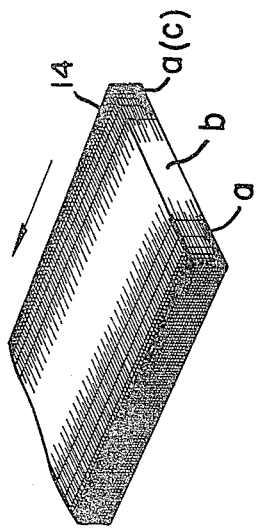
FIG. 1 and FIG. 2 are oblique views of the multi-colored synthetic resin sheet of the present invention.

The polymerizable liquid materials which may be used in the present invention include polymerizable monoethylenically unsaturated compounds or polyfunctional compounds, which are liquid under normal pressure. Suitable monoethylenically unsaturated compounds include methacrylates, ethylene and their halogen or alkyl substituted derivatives, vinyl acetate, or the like or mixtures of a major amount of said compounds with acrylates, acrylonitrile or derivatives thereof. Suitable polyfunctional compounds are glycol dimethacrylate, diallyl methacrylate, diallyl phthalate, diethylene glycol bisallyl carbonate, or the like. Mixtures of copolymers of methyl methacrylate and monomers copolymerizable therewith are especially preferred.

Polymerization initiators may be used with the polymerizable compounds. Suitable initiators include free-radical initiators such as azobisisobutyronitrile, azobisdimethylvaleronitrile, benzoyl peroxide, lauroyl peroxide, acetyl peroxide, caproyl peroxide, 2,4-dichlorobenzoyl peroxide, isopropyl peroxydicarbonate, isobutyl peroxide, acetylcyclohexylsulfonyl peroxide, or the like; which may be used alone or in combination.

Mixtures of monomers and polymers, namely mixtures of a monomer as above described in which a suitable amount of polymer is dissolved or suspended, or mixtures of partially polymerized monomers and polymers may be used, so long as the fluidity is not lost. Furthermore, as long as the polymerization is not seriously inhibited, various additives such as stbilizers, plasticizers, polymerization regulators, fillers, releasing agents, viscosity modifiers, and the like, may be admixed with the polymerizable compounds.

In the present invention, by the phrase "different colors", is intended to mean color tones ranging from colorless transparency, transparency, translucency and opaque and hue and chroma which can also be optically distinguished. Generally known dyes, pigments, and coloring additives may be used for coloring sheets. If a transparent multi-colored synthetic resin sheet is desired, preparations of one or more of the dyes or pigments which are previously dispersed in a carrier medium may be included in the polymerizable mix. Various carbonates or metal compounds may be used as the pigments. When translucent and opaque colored synthetic resin sheets are intended, it is possible to use particulate processed pigments. These are obtained by dispersing powdery or pasty pigments in polymerizable liquid raw materials, such as methyl methacrylate or styrene monomers in a high concentration, then polymerizing the dispersion with addition of polymerization initiators and finally grinding the polymers. This is especially preferred in the present invention. It is also possible to directly add powdery or pasty pigments to the liquid polymerizable compounds. In this case, however, color spots due to aggregation or sedimentation of the pigments or polymerization unevenness sometimes occurs due to the activity of the pigments, whereby the quality and appearance of the products is reduced. In order to control translucency, it is preferred to add a suitable amount of a previously prepared methyl methacrylate and styrene copolymer as a coloring assistant to the polymerizable liquid and then to carry out the polymerization.

In order that the longitudinally adjacent different colors be gradated at their boundary, each colored liquid material should have a viscosity of 3–50 poises at 20° C., preferably 5–40 poises at 20° C. when dye is used as coloring agent. Depending on the desired degree of gradation the difference in viscosity of two adjacent liquids should be less than 10 poises. When pigments are used as coloring agents the viscosities are determined depending on the desired degree of the gradation. For example, when the preferred copolymers of methyl methacrylate and styrene in a ratio of 2:8–8:2 are dissolved in an amount of 0.5–4.0%, each liquid has a viscosity of 3–30 poises at 20° C. and the difference in viscosity of two adjacent liquids should be 2–10 poises.

Good results have been obtained in the preparation of synthetic resin sheets of thicknesses of 1.5 mm–15 mm.

FIG. 1 shows a synthetic resin sheet in which two different colors (a,b) are arranged in width direction and the colors in the boundary section between said colors are in a gradated state.

Figure 2:
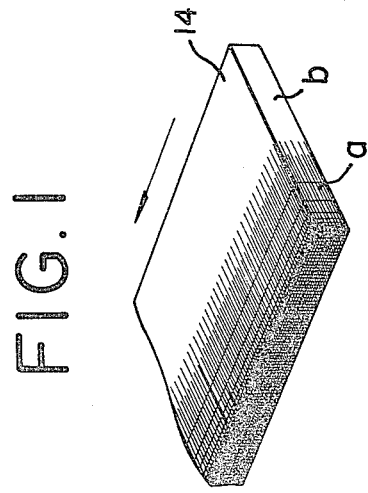

FIG. 2 shows a synthetic resin sheet in which two or three different colors (a,b, or a,b,c) are arranged in width direction and the adjacent colors are in a gradated state in their boundary portions.

Figure 3:
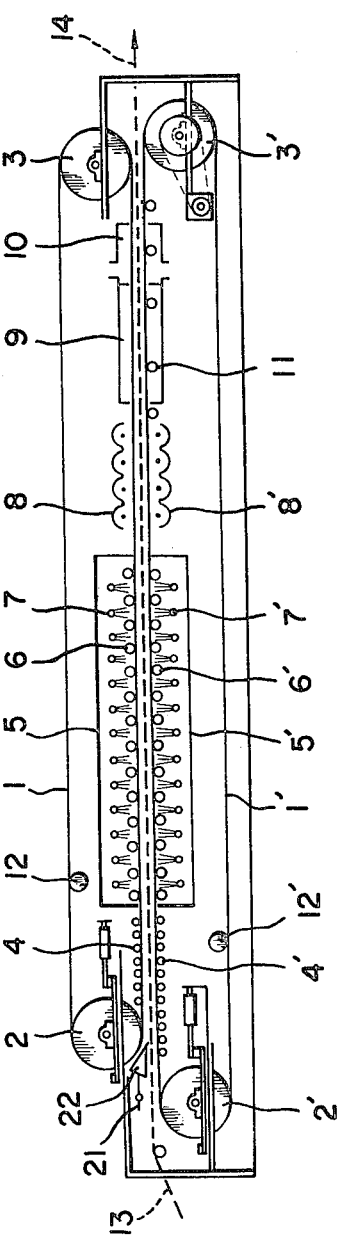
FIG. 3 is a front view of an apparatus for making the sheet of the present invention.

FIG. 3 shows one example of an opposed belts-type-continuous sheet making apparatus which may be used in practicing the present invention. In FIG. 3, endless belts 1 and 1' are usually metallic belts such as steel or stainless steel. If metallic belts 1 and 1' are used they should be polished in order to obtain sheets excellent in surface appearance. The thickness of the metallic belt is 0.1–3 mm, preferably 0.5–2 mm. These belts are stretched by main pulleys 2 and 3 and 2' and 3' and are provided with a predetermined tension. A hydraulic cylinder is provided in main pulleys 2 and 2' and the tension of the belts can be changed by changing the oil pressure. The tension of the belts can be adjusted by various means, such as for example using a spring or the like. The tension of the belts is preferably high to improve the shape of the belts to increase the accuracy of thickness of the sheets and generally they are driven at 3–15 kg/mm$^2$.

The belts are moved by driving main pulley 3' and the weaving movements of the belts are controlled by adjusting the angles between main pulleys 2 and 3 and 2' and 3'. The angles of the main pulleys are adjusted by changing the oil pressure, or by other means. The weaving movement of the belts can also be controlled by changing the angle of rolls 12 and 12' which contact the back surface of the belts.

The liquid polymerizable mixture is blended or dissolved and fed at a constant flow rate, generally using a gear pump and fed to the space between the opposed belts through conduit 21 and inclined plate 22 which form feeding devices. As the raw material feeding devices, such feeding devices as plural inclined plates 22, 22', 22" are used in the present invention to feed at least two liquid polymerizable materials. A gasket, 13 which follows the movement of the belts so as to be positioned between both ends of the opposed belts in the width direction prevents leakage of the liquid materials from the belts. Gasket 13 is made of soft polyvinyl chloride, polyethylene, ethylenevinyl acetate copolymer, polyurethane and other materials. Rolls 4, 4' and 6 and 6' support the opposed belts at their back surface. Rolls 6 should be arranged in such a manner that liquid polymerizable materials do not leak from the space formed between the opposed belts and the gaskets in polymerization zones 5 and 5'. The belts deflect between adjacent rolls due to the liquid pressure of the liquid raw materials, repulsion power of the gaskets, etc. When this deflection amount is too great, the accuracy of thickness of the sheets will be deteriorated and the gradation state of colors in the boundary portions in the sheets will unacceptably vary or the sheets will be bent causing a reduction in quality and appearance.

One method to overcome said difficulties is to make the deflection of the belts small. For this purpose, it is preferred that the interval between the arranged rolls be small and the tension of the belts be increased. Thus, the interval between rolls (distance between centers of adjacent rolls) is about 20–100 cm. The rolls are set in such a manner that even when the liquid raw materials are polymerized and shrunk they will follow the belts and will not be separated from the surface of the belts. Spraying devices 7 and 7' are provided in the polymerization zone to apply hot water to the belts as a heat source. The temperature of hot water may be lower than 100° C., but it is preferred to effect polymerization as rapidly as possible to avoid use of a large continuous sheet-making apparatus and to increase productivity. Thus, a temperature of about 65°–90° C. is generally used. Far infrared heaters 8 and 8' may be provided in the second polymerization zone and to heat the polymerized and hardened sheet to higher than 100° C. for removal of any remaining monomers. It is also possible to use a hot-air oven. Zones 9 and 10 are provided for cooling the sheet leaving the second polymerization zone. A roll 11 is provided to support the belts in said zone 9 and 10. This roll is preferably cooled by a cooling liquid. The produced sheet 14 is recovered.

Figure 4:
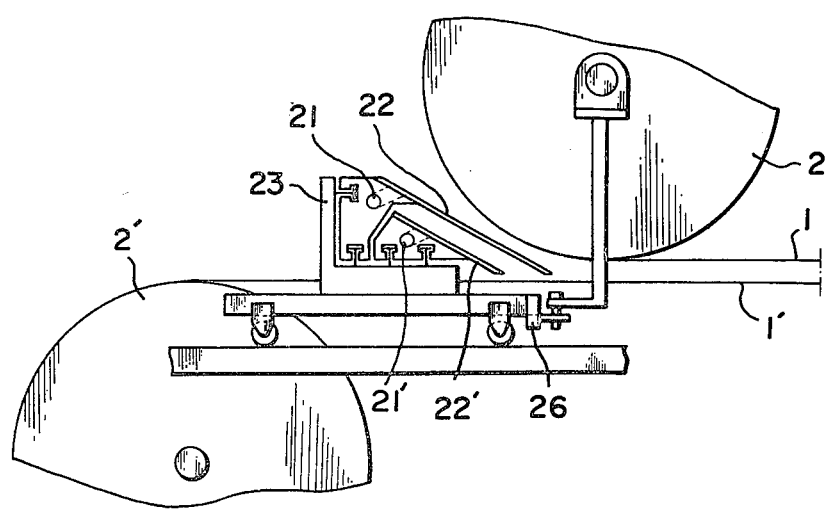
FIG. 4 and FIG. 5 are a front view and top view which show some of the main features of FIG. 3.
Figure 5:
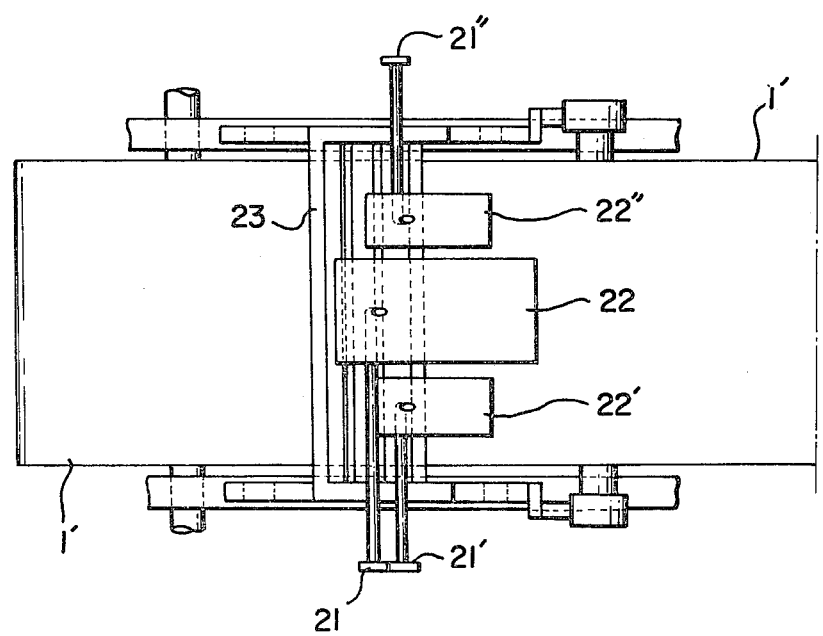

FIG. 4 and FIG. 5 show one example of devices for feeding the polymerizable liquid materials. Conduits 21, 21' and 21" for the liquid polymerizable materials are provided to constantly feed a multiplicity of different colored raw materials by optional feeding devices by a gear pump. Inclined plates 22, 22' and 22" are set in such a manner that the top ends of the plates are positioned at a given distance from the face of the lower belt 1', preferably 5–20 mm. These feeding devices can be freely moved in the width direction of the belts by a guide rail 23 and are provided on truck 26 which is connected to upper pulley 2 to prevent contact with the upper belt 1.

Having generally described this invention, a further understanding can be obtained by reference to certain specific examples which are provided herein for purposes of illustration only and are not intended to be limiting unless otherwise specified.

EXAMPLE 1

Into a methyl methacrylate syrup having a viscosity of 15 poises at 20° C. and a polymerization rate of 22%, namely, a monomer.polymer mixture, were blended and dissolved 500 ppm of azobisdimethylvaleronitrile as a polymerization initiator, 100 ppm of an ultraviolet absorbing agent and 20 ppm of dioctyl sulfosuccinate to obtain liquid raw material A. Separately, to the same methyl methacrylate syrup as above, 5% of methyl methacrylate monomer was added and the viscosity at 20° C. was 9 poises. Then was added 500 ppm of azobisdimethylvaleronitrile, 100 ppm of an ultraviolet absorbing agent, 20 ppm of dioctyl sulfosuccinate and 0.1% of a coloring agent obtained by dispersing ultramarine blue in a dispersion medium. Liquid raw material B was thus obtained. These liquid raw materials A and B were deaerated under reduced pressure and then were fed to the continuous sheet making apparatus by continuously feeding them between belts 1 and 1' through inclined plates 22, 22' and 22'' which are a part of each feeding device shown in FIG. 4 and FIG. 5 through a gear pump. Belts 1 and 1' are endless belts of polished stainless steel having a thickness of 1.5 mm and a width of 1500 mm. Stretch was given to them by main pulleys 2 and 2' of 1500 mm in diameter, tension of the belts was set at 10 kg/mm$^2$ by oil pressure and the belts were moved at a speed of 2.4 m/min. The space between upper and lower belts 1 and 1' was maintained by roller groups 6 and 6' arranged at the interval of 400 mm so that the sheet like polymer had a uniform thickness of 3 mm. Gasket 13 used was a hollow pipe having an outer diameter of 8 mm and a thickness of 0.6 mm and made of polyvinyl chloride containing 60% (based on the polymer) of dibutyl phthalate as a plasticizer.

The first polymerization zones 5 and 5' had a length of 66 m and were heated by scattering hot water of 80° C. in shower form on the back surface of the belts from spraying devices 7 and 7'. Length of the second polymerization zones was 10 m and the sheets were heated to 135° C. by far infrared heaters 8 and 8'. Length of the heat retaining zone 9 was 10 m and the belts travelled through a duct which surrounded the belts. The length of cooling zone 10 was 2 m and the polymerized and hardened sheet which had a temperature of higher than 100° C. at the inlet of the cooling zone 10 was cooled to 100°–80° C. and taken out from the belts.

The thus obtained sheet was a methyl methacrylate multi-colored synthetic resin sheet excellent in appearance and having a thickness of 3 mm and a width of 400 mm in which the central portion of about 500 mm was colorless and transparent and both external portions were transparent blue and the two colors which were adjacent to each other in the portion of about 200 mm in width were gradated from colorless transparence to transparent blue.

EXAMPLE 2

Example 1 was repeated except as follows. 50 ppm of an oil soluble blue dye was dissolved in liquid raw material A. 40 ppm of an oil soluble blue dye and 0.9% of a copolymer of methyl methacrylate and styrene (3:7) were dissolved in liquid raw material B and this had a viscosity of 12 poises. As a result, there was obtained a multi-colored synthetic resin sheet mainly composed of methyl methacrylate, excellent in appearance and having a thickness of 3 mm in which the central portion of about 450 mm was transparent blue and both external portions were translucent and the two colors which were adjacent to each other were gradated in a width of about 200 mm from the transparent blue to the translucent blue from the upper surface to the back surface of the sheet.

EXAMPLE 3

Example 1 was repeated as follows. 0.2% of a coloring agent prepared by dispersing carbon in a dispersion medium was added to liquid raw material A and 0.25% of such coloring agent used in liquid raw material A and 1.0% of a copolymer of methyl methacylate and styrene (4.:6) were dissolved in liquid raw material B. Furthermore, liquid raw material C was prepared by adding 8% of methyl methacrylate monomer to the methyl methacrylate syrup of Example 1, adjusting the viscosity at 20° C. to 7 poises and then adding thereto 2% of a powder mixture of carbon, methyl methacrylate monomer and a copolymer of methyl methacrylate and styrene as a coloring agent. These liquid raw materials A, B and C were fed in this order in the width direction in the continuous sheet making apparatus shown in FIG. 3 through a gear pump and pouring devices. They were then polymerized therein to obtain a multi-colored synthetic resin sheet having a width of 1400 mm, a thickness of 4 mm and excellent in appearance which had a smoky transparent portion, a light black translucent portion and a black translucent portion, in width direction, wherein the adjacent two colors were gradated in their boundary portion in a width of about 200 mm from the upper surface to the back surface of the sheet.

Having now fully described this invention, it will be apparent to one of ordinary skills in the art that many changes and modifications can be made thereto without departing from the spirit or scope of the invention set forth herein.

What is claimed and intended to be covered by Lettes Patent is:

1. A multi-colored synthetic resin sheet having an upper surface, a lower surface, and a uniformly colored longitudinal cross-section, which has at least two longitudinally adjacent different colors with a boundary portion therein between, with the boundary portion between said colors being in a gradated state on the upper surface, on the lower surface and throughout a transversal cross-section of said sheet.

2. The sheet of claim 1, wherein said sheet further comprises a dye or a pigment.

3. The synthetic resin sheet of claim 1 wherein the thickness of said sheet is 1.5 mm–15 mm.

4. The sheet of claim 1, wherein said synthetic resin is a polymer prepared from monomers selected from the group consisting of monoethylenically unsaturated compounds, polyfunctional polymerizable compounds, and mixtures thereof, wherein said compounds are liquid under normal pressure.

5. The sheet of claim 4, wherein said monoethylenically unsaturated compounds are selected from the group consisting of methacrylate, halogen or alkyl substituents thereof; ethylene, halogens or alkyl substituents thereof; vinyl acetate; acrylates; acrylonitrile, substituted derivatives thereof; and mixtures thereof.

6. The sheet of claim 4, wherein said polyfunctional compounds are selected from the group consisting of glycol dimethacrylate, diallyl methacrylate, diallyl phthalate, diethylene glycol bisallyl carbonate and mixtures thereof.

7. The sheet of claim 4, wherein said polymerizable liquid material comprises a copolymer of methyl methacrylate.

8. A method of producing a multi-colored synthetic resin sheet which comprises:
adjacently feeding onto a moving belt at least two differently colored liquids comprising polymerizable monomer;
polymerizing and hardening said liquids; thereby obtaining a multi-colored synthetic resin sheet which has an upper surface, a lower surface, and a uniformly colored longitudinal cross-section, which has at least two longitudinally adjacent colors with the boundary portion between said colors being in a gradated state on the upper surface, on the lower surface, and throughout a transversal cross-section of said sheet.

9. The method of claim 8 wherein the difference in viscosity between two adjacent liquid raw materials is less than 10 poises at 20° C.

10. The method of claim 8 wherein said liquid polymerizable materials comprise a mixture of monomers and polymers.

11. The method of claim 8 wherein said liquid raw materials further comprise an additive selected from the group consisting of initiators, stabilizers, plasticizers, polymerization regulators, fillers, releasing agents, viscosity modifiers and mixtures thereof.

12. The method of claim 8 wherein after hardening, said synthetic resin sheet is cooled.

13. The method of claim 8 wherein said moving belts comprises a continuous-belt, sheet-making apparatus.

14. The synthetic resin sheet produced by the method of claim 8.

15. The method of claim 8 wherein the liquid polymerizable materials comprise a dye or a pigment dispersed in a carrier medium.

16. The method of claim 15 wherein said pigment or dye is in the powdery or pasty form.

17. The method of claim 8, wherein the viscosity of said colored polymerizable liquid material is 30-50 poises at 20° C.

18. The method of claim 13 wherein said viscosity is 5-40 poises at 20° C.

19. The method of claim 8 wherein said polymerizable liquid materials comprise a compound selected from the group consisting of monoethylenically unsaturated compounds, polyfunctional polymerizable compounds, and mixtures thereof, wherein said compounds are liquids under normal pressure.

20. The method of claim 19 wherein said monoethylenically unsaturated compounds are selected from the group consisting of methacrylates, halogen or alkyl substituents thereof; ethylene, halogens or alkyl substituents thereof; vinyl acetate; acrylates; acrylonitrile, substituted derivatives thereof; and mixtures thereof.

21. The method of claim 19 wherein said polyfunctional compounds are selected from the group consisting of glycol dimethacrylate, diallyl methacrylate, diallyl phthalate, diethylene glycol bisallyl carbonate and mixtures thereof.

22. The method of claim 19 wherein said liquid materials comprise a copolymer of methyl methacrylate.

23. The method of claim 8 wherein said liquid polymerizable material comprises a copolymer of methyl methacrylate and styrene in a ratio of 2:8-8:2.

24. The method of claim 23 wherein said copolymer is dissolved in an amount of from 0.5 to 4% by weight.

25. The method of claim 8 wherein said polymerization comprises two polymerization stages; wherein the first stage is carried out at a temperature of less than 100° C. and the second stage is carried out at a temperature of higher than 100° C.

26. The method of claim 25 wherein the temperature of said first stage is about 65°-90° C.

* * * * *

UNITED STATES PATENT AND TRADEMARK OFFICE
CERTIFICATE OF CORRECTION

PATENT NO. : 4,232,078

DATED : November 4, 1980

INVENTOR(S) : ISAO KAMADA

It is certified that error appears in the above—identified patent and that said Letters Patent is hereby corrected as shown below:

Column 2, line 6, delete "partionings" and insert --partitionings--; and

Column 2, line 55, delete "stbilizers" and insert --stabilizers--.

Column 6, line 16, delete "(4.:6)" and insert --(4:6)--.

Signed and Sealed this

Twelfth Day of May 1981

[SEAL]

Attest:

RENE D. TEGTMEYER

Attesting Officer

Acting Commissioner of Patents and Trademarks